US011096053B2

(12) United States Patent
Kim et al.

(10) Patent No.: US 11,096,053 B2
(45) Date of Patent: Aug. 17, 2021

(54) METHOD FOR MANAGING SESSION

(71) Applicant: LG Electronics Inc., Seoul (KR)

(72) Inventors: Hyunsook Kim, Seoul (KR); Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/348,075

(22) PCT Filed: Nov. 7, 2017

(86) PCT No.: PCT/KR2017/012534
§ 371 (c)(1),
(2) Date: May 7, 2019

(87) PCT Pub. No.: WO2018/084686
PCT Pub. Date: May 11, 2018

(65) Prior Publication Data
US 2019/0335316 A1  Oct. 31, 2019

Related U.S. Application Data

(60) Provisional application No. 62/418,310, filed on Nov. 7, 2016.

(51) Int. Cl.
*H04W 12/062* (2021.01)
*H04W 76/11* (2018.01)
(Continued)

(52) U.S. Cl.
CPC ........... *H04W 12/062* (2021.01); *H04W 8/04* (2013.01); *H04W 8/085* (2013.01); *H04W 60/04* (2013.01); *H04W 76/11* (2018.02)

(58) Field of Classification Search
CPC . H04W 8/085; H04W 12/06; H04W 12/0602; H04W 36/0022; H04W 36/0038;
(Continued)

(56) References Cited

U.S. PATENT DOCUMENTS

2006/0294363 A1  12/2006  Bae et al.
2012/0014324 A1   1/2012  Dwyer et al.
(Continued)

FOREIGN PATENT DOCUMENTS

CN  101843126  9/2010
CN  104506406  4/2015
(Continued)

OTHER PUBLICATIONS

Huawei, HiSilicon, KPN, "Key hierarchy and the related procedure," S3-161490, 3GPP TSG SA WG3 (Security) Adhoc Meeting on FS_NSA, San Diego, USA, Sep. 27-29, 2016, 4 pages.
(Continued)

*Primary Examiner* — Harun Chowdhury
(74) *Attorney, Agent, or Firm* — Fish & Richardson P.C.

(57) ABSTRACT

A disclosure of the present specification provides a method for processing a NAS request message by an MMF node. The method may comprise the steps of: when it is identified that an NAS request message has been received through a second access network, checking whether a first MM context and a first security context are included therein; and acquiring a second security context from an authentication CP node, and generating a second MM context.

4 Claims, 16 Drawing Sheets

(51) Int. Cl.
*H04W 8/04* (2009.01)
*H04W 8/08* (2009.01)
*H04W 60/04* (2009.01)

(58) Field of Classification Search
CPC ..... H04W 36/14; H04W 76/11; H04W 84/12; H04W 12/062
USPC ...... 370/329, 331, 338; 455/411, 436; 726/3
See application file for complete search history.

(56) References Cited

U.S. PATENT DOCUMENTS

| | | | |
|---|---|---|---|
| 2013/0042304 A1* | 2/2013 | Rajavelsamy | H04W 36/0022 726/3 |
| 2014/0078890 A1* | 3/2014 | Lu | H04W 36/0022 370/221 |
| 2014/0245403 A1 | 8/2014 | Li et al. | |
| 2015/0117310 A1 | 4/2015 | Zexian et al. | |
| 2016/0295398 A1 | 10/2016 | Ketheesan et al. | |
| 2018/0124593 A1* | 5/2018 | Ricciato | H04W 12/06 |
| 2019/0215903 A1* | 7/2019 | Wu | H04W 36/0038 |

FOREIGN PATENT DOCUMENTS

| | | |
|---|---|---|
| CN | 104823498 | 8/2015 |
| EP | 2317694 | 5/2011 |
| EP | 2605606 A2 | 6/2013 |
| EP | 2605606 A3 | 12/2016 |
| KR | 101091300 | 12/2011 |

OTHER PUBLICATIONS

Extended European Search Report in European Patent Application No. 17867348.9, dated Jul. 11, 2019, 13 pages.
Samsung, "Signalling procedures for the LTE light connection mode," R2-166063, 3GPP TSG-RAN WG2 Meeting #95bis, Kaohsiung, Taiwan, Oct. 10-14, 2016, 6 pages.
Ericsson, "Distribution of security data," S3-000144, 3GPP TSG-CN SWG2B, Milano, Italy, Feb. 14-16, 2000, 6 pages.
CN Office Action in Chinese Appln. No. 201780071839.6, dated May 31, 2021, 17 pages (with English translation).
Huawei, HiSilicon, KPN, "Key hierarchy and the related procedure," S3-161490, 3GPP TSG SA WG3 (Security) Adhoc Meeting on FS_NSA, San Diego, USA, dated Sep. 27-29, 2016, 4 pages.

* cited by examiner

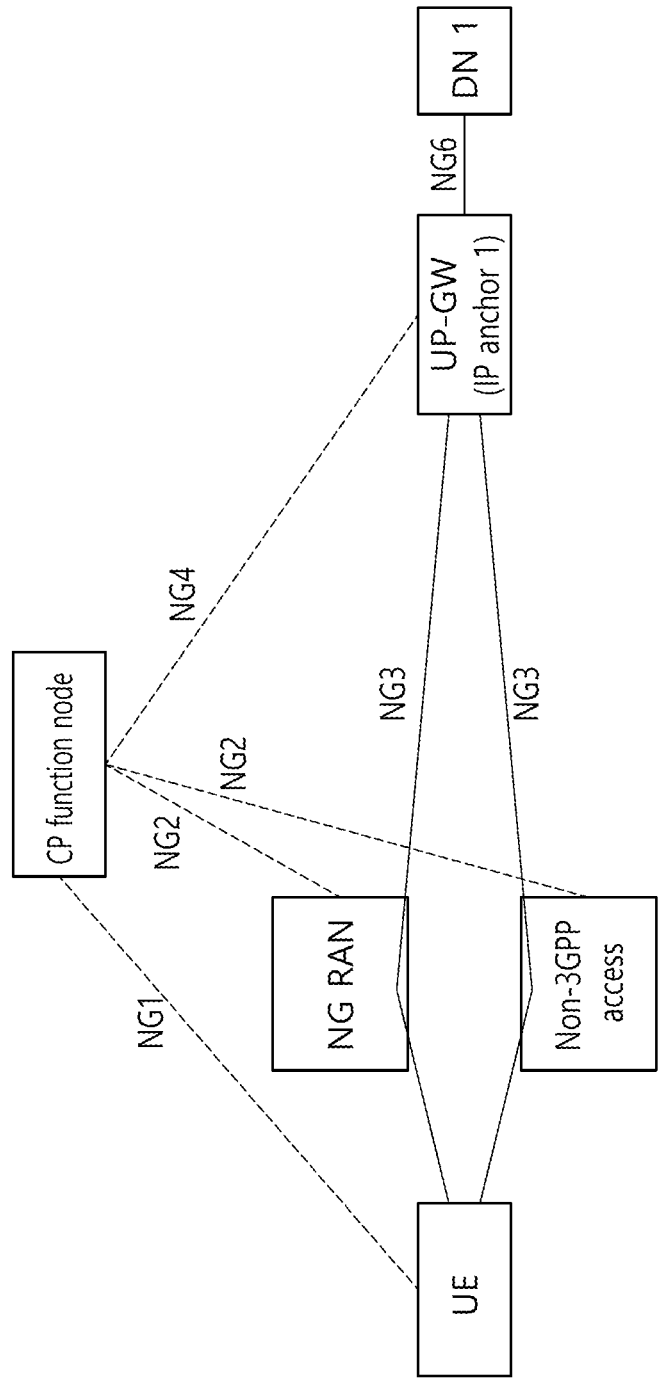

METHOD FOR MANAGING SESSION

CROSS-REFERENCE TO RELATED APPLICATIONS

This application is a National Stage application under 35 U.S.C. § 371 of International Application No. PCT/KR2017/012534, filed on Nov. 7, 2017, which claims the benefit of U.S. Provisional Application No. 62/418,310, filed on Nov. 7, 2016. The disclosures of the prior applications are incorporated by reference in their entirety.

BACKGROUND OF THE INVENTION

Field of the Invention

The present invention relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility |

TABLE 1-continued

| REFERENCE POINT | DESCRIPTION |
|---|---|
| | support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2A illustrates an expected structure of the next-generation mobile communication from the viewpoint of a node.

As may be seen with reference to FIG. 2A, a UE may access the core network through a next-generation Radio Access Network (RAN). The next-generation core network may include a control plane (CP) function node and a user plane (UP) function node. The CP function node, which is a node for managing UP function nodes and RAN, transmits and receives a control signal. The CP function node performs all or part of the functions of a Mobility Management Entity (MME) in the fourth generation mobile communication; and all or part of the control plane functions of a Serving Gateway (S-GW) and a PDN Gateway (P-GW). The UP function node is a kind of gateway through which user data are transmitted and received. The UP function node may perform all or part of the user plane functions of the S-GW and the P-GW in the fourth generation mobile communication.

The Policy Control Function (PCF) in the figure is a node for controlling the policies of a service provider. And the subscriber information server shown stores subscription information of a user.

FIG. 2B illustrates an expected structure of the next-generation mobile communication from the viewpoint of a session.

As shown in the figure, the core network is divided into a control plane (CP) and a user plane (UP). The control plane (CP) may include a policy control function (PCF), a subscriber information server, and a CP node which performs session management (SM). And the user plane (UP) may include a UP function node. The nodes within the control plane (CP) are implemented through cloud virtualization. And so are the nodes within the user plane (UP).

The UE may request creation of a session directed to a data network (DN) through an access network (AN). The session may be created and managed by the CP node for session management (SM). At this time, the session management may be performed according to the information stored in the subscriber information server and the policies (for example, a QoS management policy) of a service provider stored within the policy control function (PCF) entity. In other words, if receiving a request for creation/modification/release of a session from the UE, the CP node for session management (SM) obtains the information through interaction with the subscriber information server and the policy control function (PCF) and creates/modifies/releases the session. Also, the CP node for session management (SM) selects a UP function node for the session and allocates resources of the core network. Also, the CP node for session management (SM) may allocate an IP address directly to the UE or request the UP function node to allocate an IP address to the UE.

As described so far, in the next generation mobile communication, the UE is expected to be able to create a plurality of sessions through different access networks. Herein, the authentication CP used for authentication may be different from the CP used to process attach NAS messages. In this case, it may be difficult to efficiently manage the session.

SUMMARY OF THE INVENTION

Accordingly, one aspect of the present invention aims to provide a method for efficient management of a session when the authentication CP used for authentication and the CP used to process an attach NAS message are different from each other.

In order to achieve the above-state objects, a disclosure of the present specification provides a method for processing a non-access-stratum (NAS) request message in a mobility management function (MMF) node, including: receiving a NAS request message from a terminal; checking which access network the NAS request message from the terminal has been received via; checking, when a NAS request message from the terminal is confirmed to have been received via a second access network, whether there are a first mobility management (MM) context and a first security context which have been generated during a previous registration process through a first access network; obtaining a second security context, generated during an authentication procedure for the second access network, from an authentication control plane (CP) node; generating a second MM context based on at least one of the first MM context and the first security context, and the second security context obtained through the second access network; and transmitting a response message to the NAS request message to the terminal through the PDG.

The information contained in the NAS request message may be a Global Unique Temporary Identity (GUTI).

The NAS request message further may include information on the authentication CP.

If the first MM context is updated based on the second security context, the second security context present in the authentication CP node may be released.

The first MM context and the second MM context may be created and managed in access units.

The NAS request message may be received from a PDG (Packet Data Gateway) or received from the authentication CP.

In order to achieve the above-state objects, another disclosure of the present specification provides a method for managing a session of a packet data gateway (PDG), including: configuring a routing table based on information obtained from a home subscriber server (HSS) when a terminal performs an authentication procedure in order to generate an Internet protocol security (IPsec) tunnel through a second access network after accessing a first access network wherein information on an authentication control plane (CP) is stored in the routing table; updating, if a request of the terminal is processed by a mobility management function (MMF) node within the first access network, the information on the authentication CP with information on the MMF; and delivering, if the PDG receives a non-access-stratum (NAS) message from the terminal through the IPsec tunnel, the NAS message to the MMF instead of the authentication CP based on the updated routing table.

The method may further include receiving, by the PDG, information indicating an update of the security context has been completed from the MMF if the NAS access is completed as the MMF receives the security context.

The security context may be updated from the authentication CP to the MMF upon a request of the MMF that received the NAS message.

The NAS message may include information indicating that the authentication procedure through the second access network has been completed and information about the authentication CP associated with the authentication procedure.

The updating of the information on the authentication CP with information on the MMF in the routing table may be performed when the information on the MMF is included in the information obtained from the HSS.

In order to achieve the above-state objects, another disclosure of the present specification provides a mobility management function (MMF) node including: a transmission/reception unit configured to receive a non-access-stratum (NAS) request message from a terminal; and a processor configured to check which access network the NAS request message has received via, wherein the processor, if the NAS request message from the terminal has been received through a second access network, checks whether there are a first mobility management (MM) context and a first security context which have been generated during a previous registration process through a first access network based on information included in the NAS request message and obtains a second security context, generated during an authentication procedure for the second access network, from an authentication control plane (CP) node, wherein the processor generates the first MM context and the first security context and generates a second MM context based on one of the second security contexts obtained through the second access network, and wherein the transmission/reception unit transmits a response message to the NAS request message to the terminal through the PDG.

According to the disclosures of this specification, the above-described problems are solved.

BRIEF DESCRIPTION OF THE DRAWINGS

FIGS. 3A to 3C are exemplary diagrams showing examples of sessions generated through a plurality of accesses.

Figure 1:
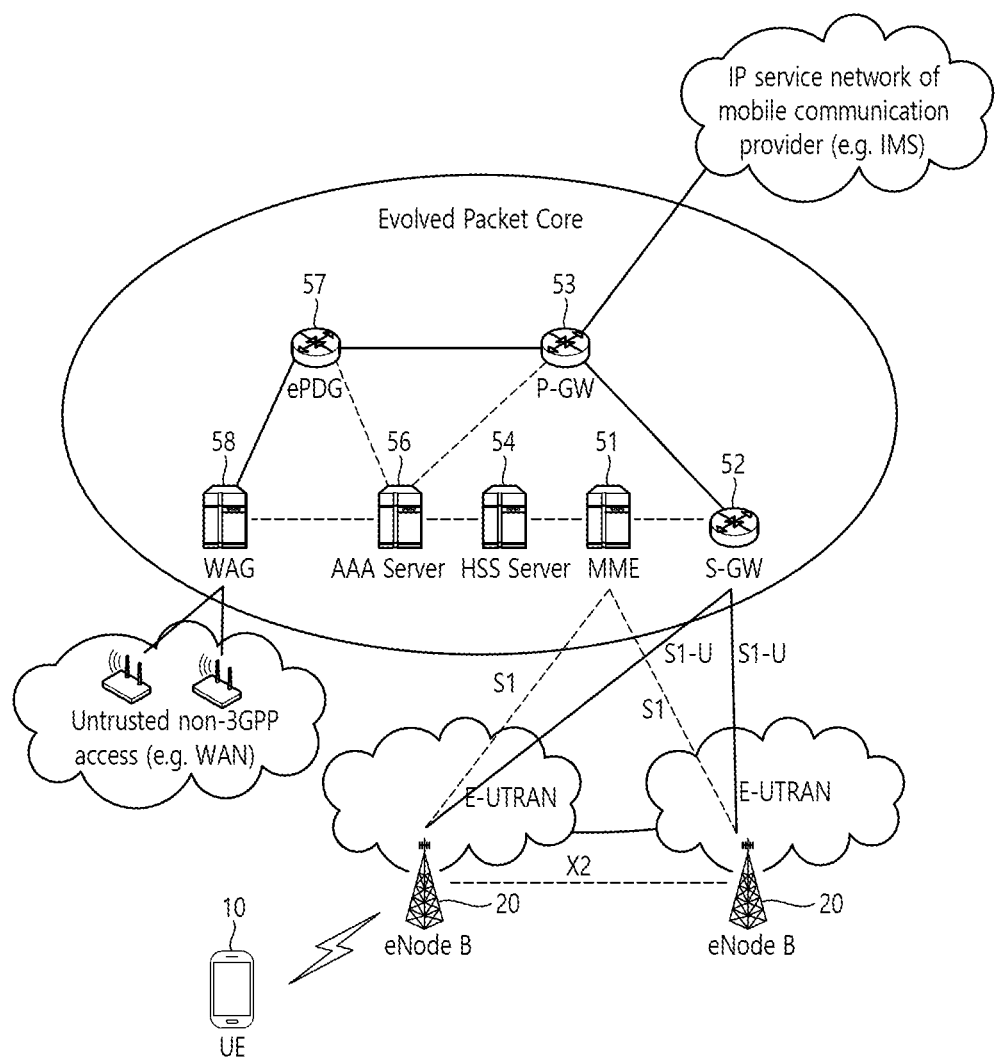
FIG. 1 shows the configuration of an evolved mobile communication network.
Figure 2A:
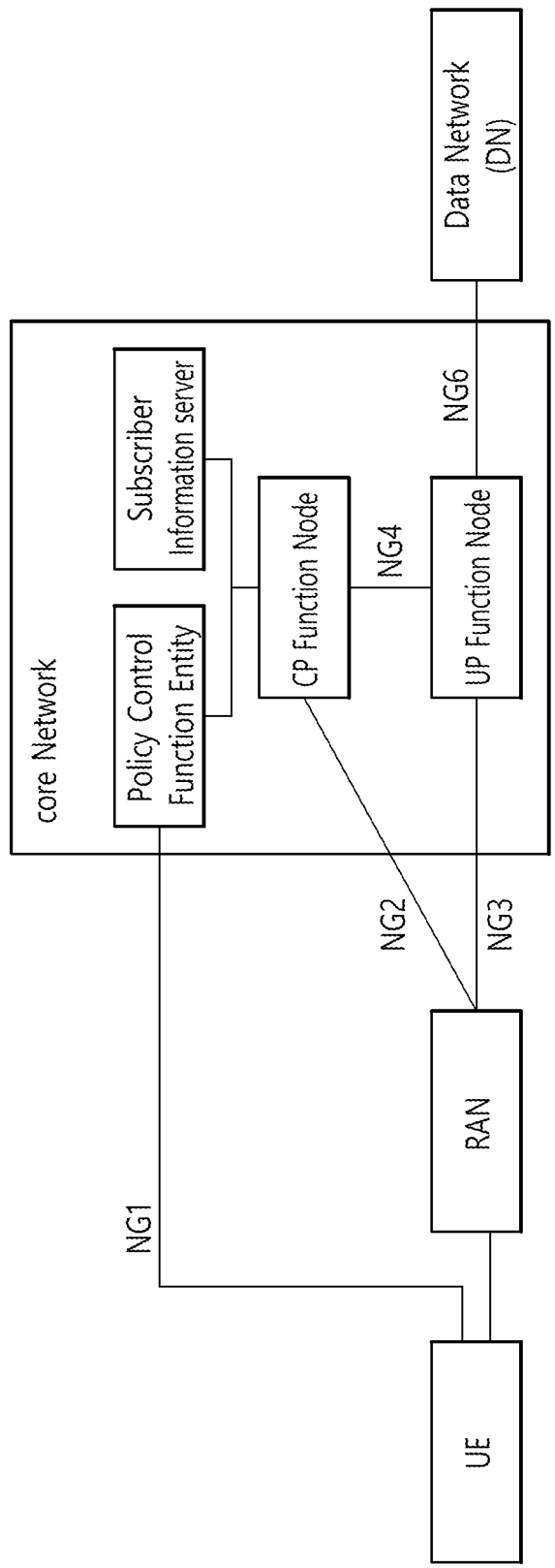
FIG. 2A illustrates an expected structure of the next-generation mobile communication from the viewpoint of a node.
Figure 2B:
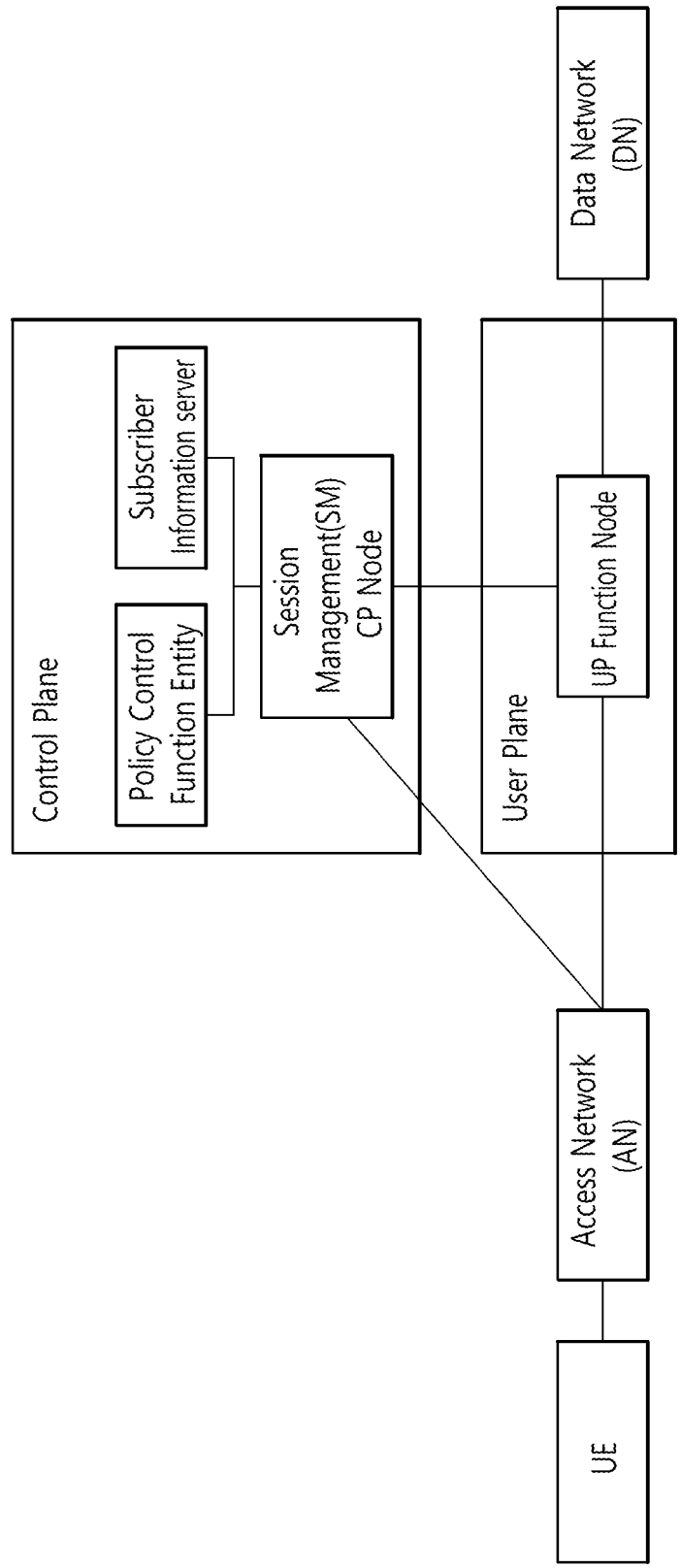
FIG. 2B illustrates an expected structure of the next-generation mobile communication from the viewpoint of a session.

DESCRIPTION OF EXEMPLARY
EMBODIMENTS

The present invention is described in light of UMTS (Universal Mobile Telecommunication System) and EPC (Evolved Packet Core), but not limited to such communication systems, and may be rather applicable to all communication systems and methods to which the technical spirit of the present invention may apply. The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

APDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is divided into a home PLMN (HPLMN) and a visited PLMN (VPLMN).

Next generation (NG) radio access network (RAN): means a radio access network including a base station in next-generation mobile communication defined by 3GPP.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

<Management of Session in Next-Generation Mobile Communication>

In next-generation mobile communication, a UE may establish one or more protocol data unit (PDU) sessions through several accesses (i.e., several radio access technology (RAT)).

Specifically, the UE may generate a plurality of PDU sessions toward several data networks through a plurality of accesses.

Alternatively, the UE may generate a plurality of PDU sessions toward one identical data network through a plurality of accesses.

Alternatively, the UE may generate one PDU session toward one identical data network through a plurality of accesses.

This is described below with reference to the drawings.

Figure 3A:
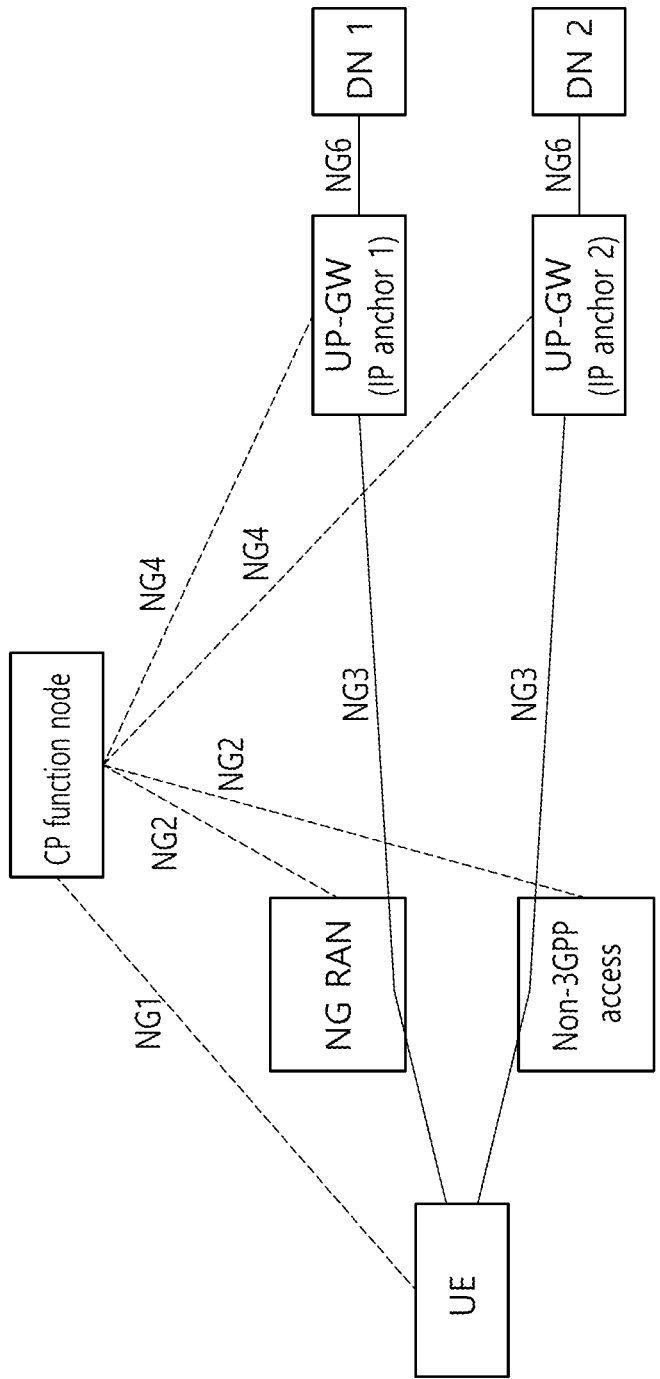
Figure 3B:
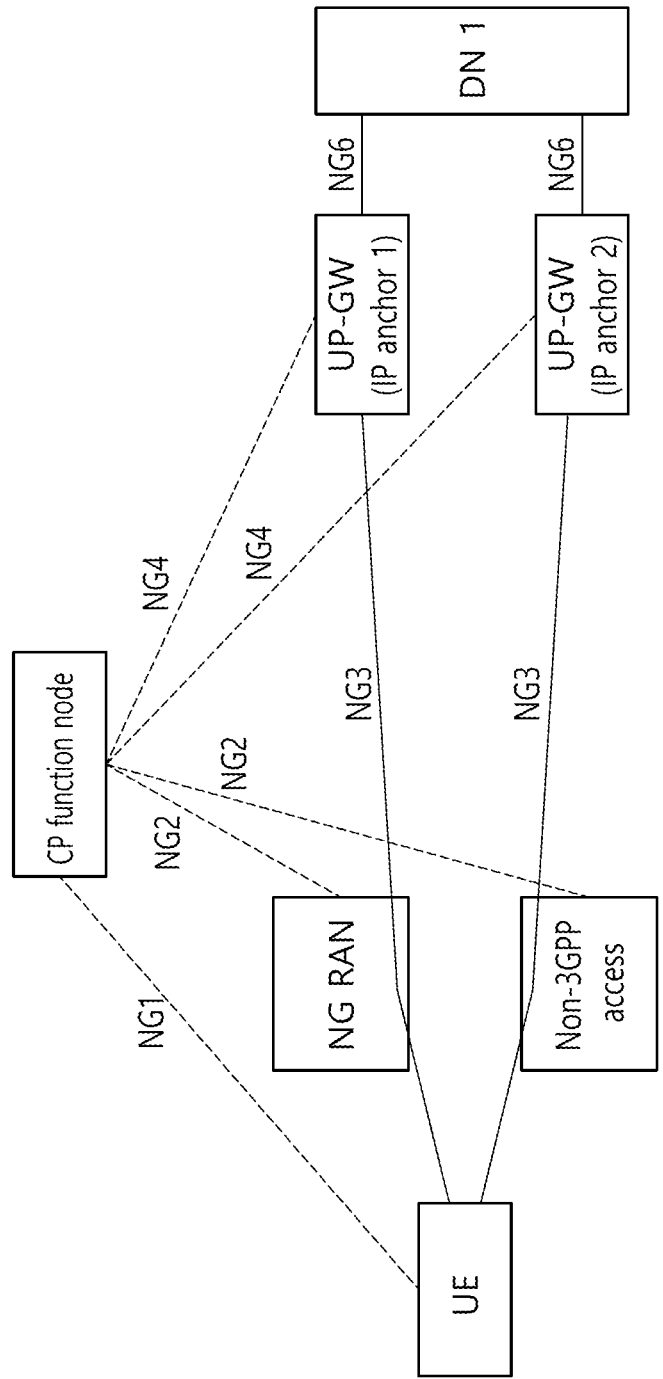

FIGS. 3A to 3C are exemplary diagrams showing examples of sessions generated through a plurality of accesses.

As may be seen with reference to FIG. 3A, a UE may have a plurality of sessions toward several data networks (e.g., shown DN 1 and DN 2) through several accesses (e.g., 3GPP accesses, for example, shown NG RAN and non-3GPP access). In this case, the non-3GPP access may mean an access not defined by 3GPP, for example, a wireless local area network (WLAN) access point (AP).

Alternatively, as may be seen with reference to FIG. 3B, a UE may have a plurality of sessions toward one data network (e.g., shown DN 1) through several accesses (e.g., 3GPP accesses, for example, shown NG RAN and non-3GPP access). In this case, in FIG. 3B, a session through a first access (shown 3GPP access, for example, shown NG RAN) is directed toward the data network via an IP anchor 1, and a session through a second access (shown non-3GPP access) is directed toward the same data network via an IP anchor 2.

In FIG. 3C, both a first session through a first access (shown 3GPP access, for example, shown NG RAN) and a second session through a second access (shown non-3GPP access) have been illustrated as being directed toward the same data network through one identical anchor 1.

The generation and release of the first session through the first access (shown 3GPP access, for example, shown NG RAN) may be performed through NG1 signaling. The generation and release of the second session through the second access (shown non-3GPP access) may also be performed through the NG1 signaling.

Accordingly, in next-generation mobile communication, session management (SM) context must have information on an access network type.

Figure 4A:
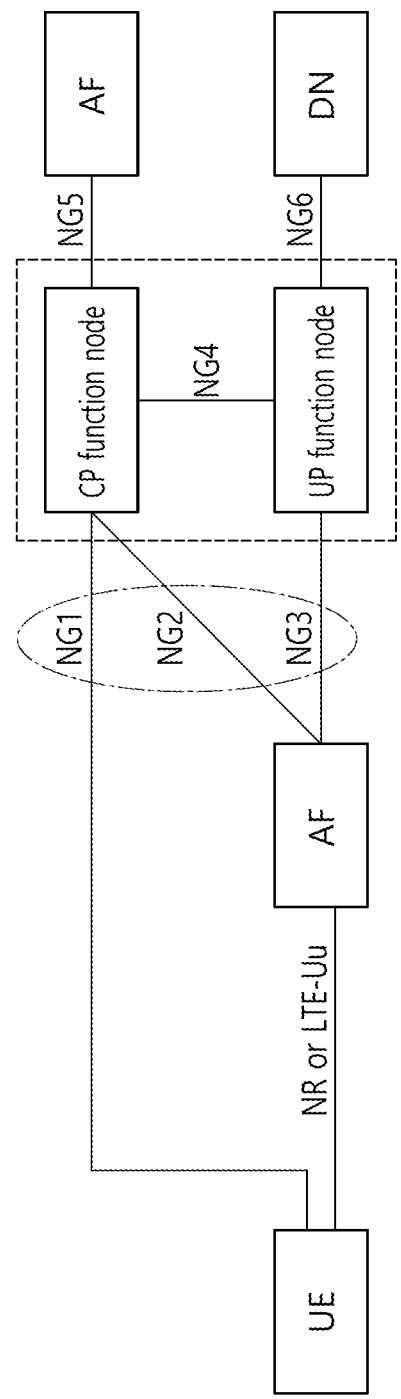
FIGS. 4A to 4C show architecture for managing sessions generated through a plurality of accesses.
Figure 4B:
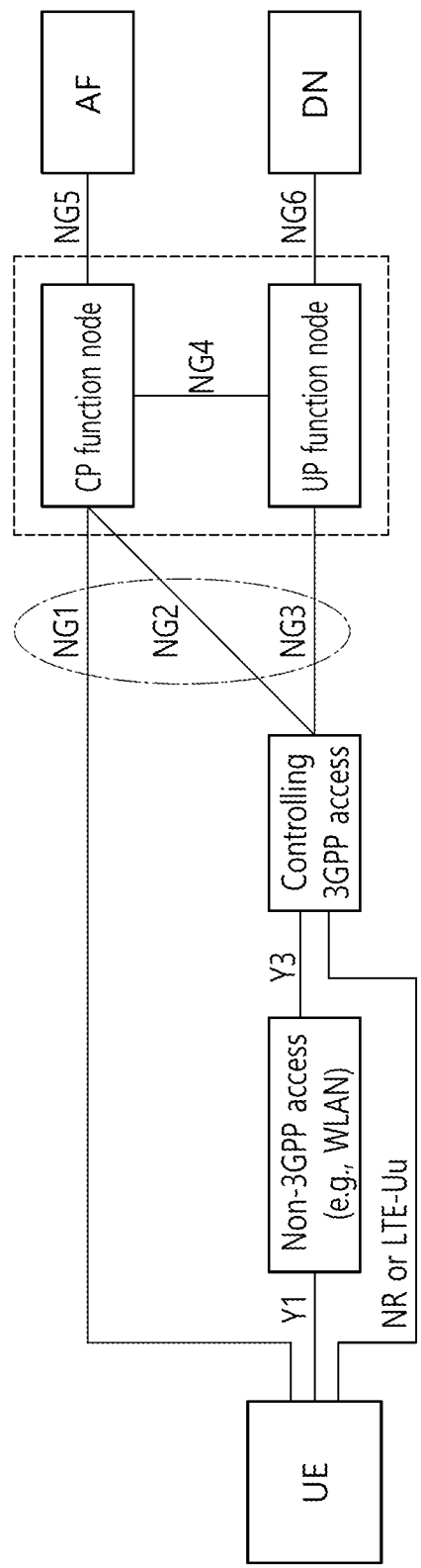
Figure 4C:
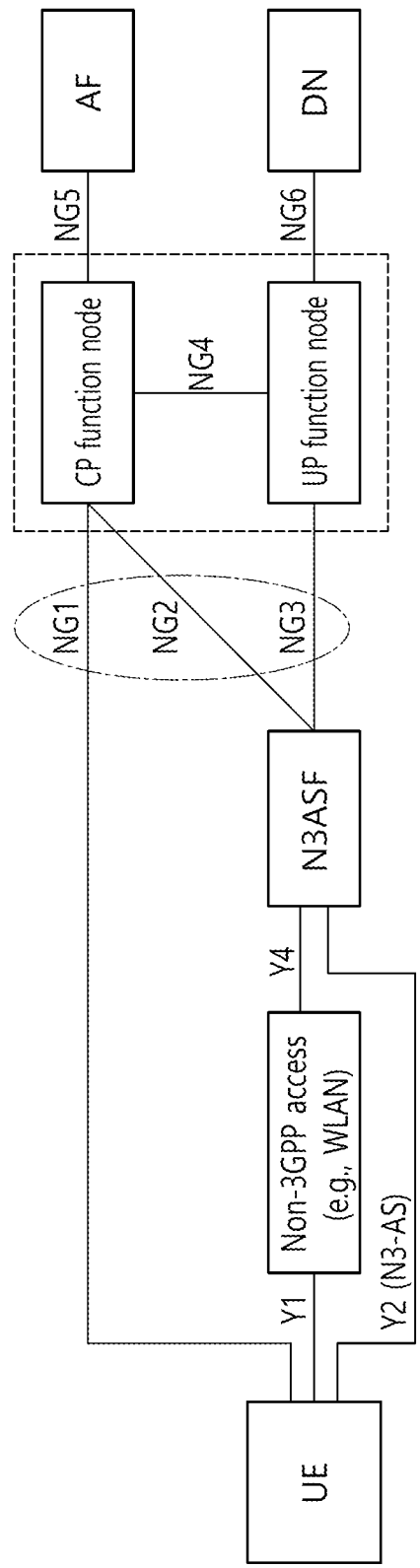

FIGS. 4A to 4C show architecture for managing sessions generated through a plurality of accesses.

The architecture shown in FIG. 4A shows an example in which only a 3GPP access is used.

The architecture shown in FIG. 4B is for a case where a non-3GPP access is installed within coverage of a 3GPP access. Furthermore, the architecture shown in FIG. 4C is for a case where a non-3GPP access is solely installed.

As shown, a core network for next-generation mobile communication may be divided into a CP function node and an UP function node.

Shown interfaces are as follows.

Y1: an interface between a UE and a non-3GPP access (e.g., WLAN)

Y2: an interface between the UE and a non-3GPP access layer function (N3ASF). A protocol used through Y2 may be called a non-3GPP access stratum (N3-AS) protocol.

Y3: an interface between a controlling 3GPP access and a non-3GPP access.

Y4: an interface between the N3ASF and the non-3GPP access.

Meanwhile, in FIGS. 5b and 5c, all the interfaces NG1, NG2, and NG3 are exposed to the core network.

However, in FIG. 4C, the interfaces NG2 and NG3 are connected to the non-3GPP access layer function (N3ASF). Furthermore, in the architecture shown in FIG. 4C, a non-3GPP access stratum (N3-AS) protocol is used between the UE and the N3ASF.

Figure 5:
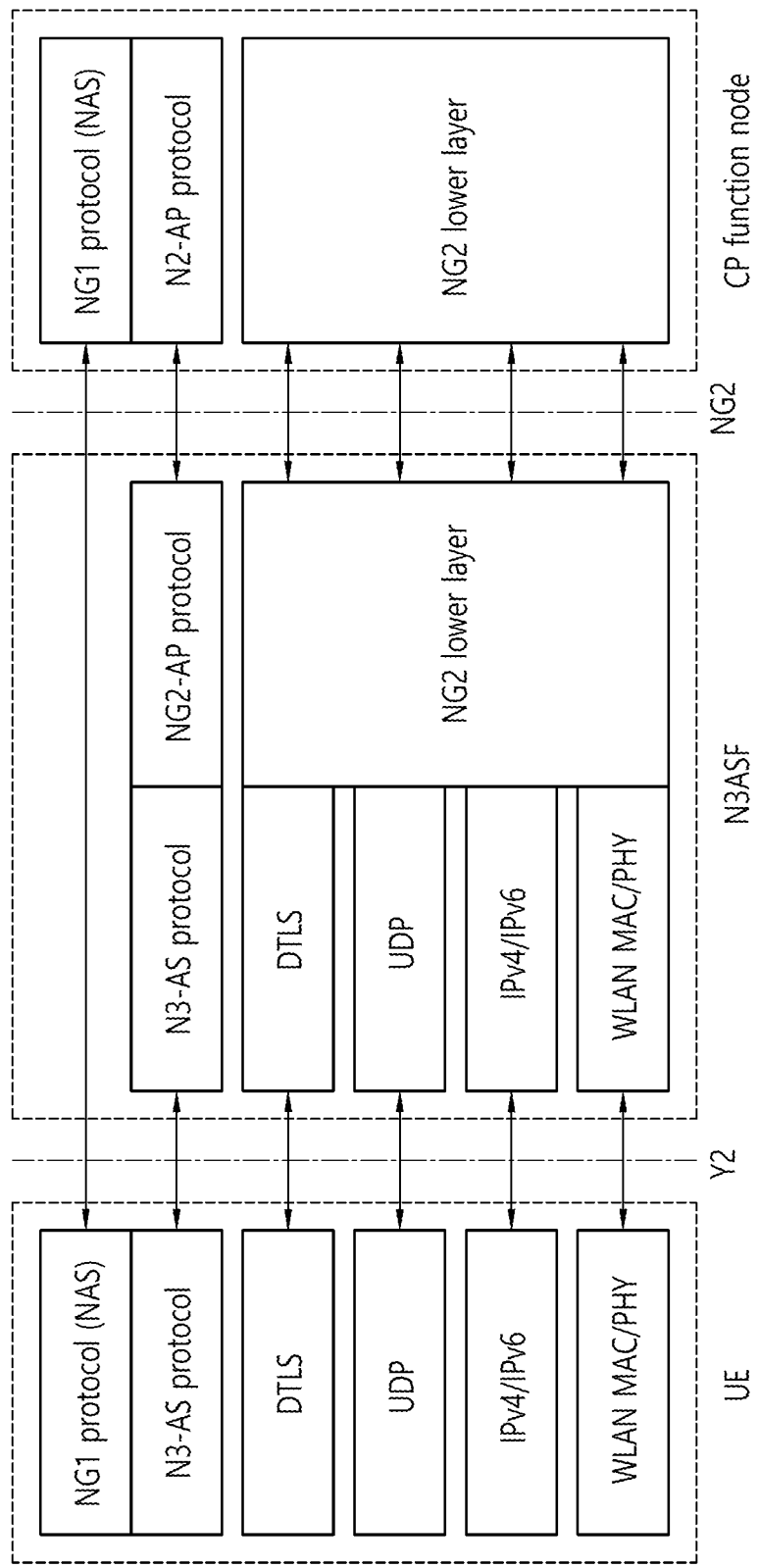
FIG. 5 shows a protocol stack between a UE and an N3ASF and a CP function.

FIG. 5 shows a protocol stack between a UE and an N3ASF and a CP function.

An N3-AS protocol of protocol stacks shown in FIG. 5 is used between a UE and an N3ASF. The N3-AS may be compared with RRC in terms of the location of the protocol stack. When compared with RRC, the N3-AS protocol has a simpler radio resource control function. The N3-AS protocol includes security information, and is chiefly used to exchange information on the bearer of a user plane between the UE and the N3ASF and to transparently transmit NAS messages between the UE and a core network (CN).

Figure 6:
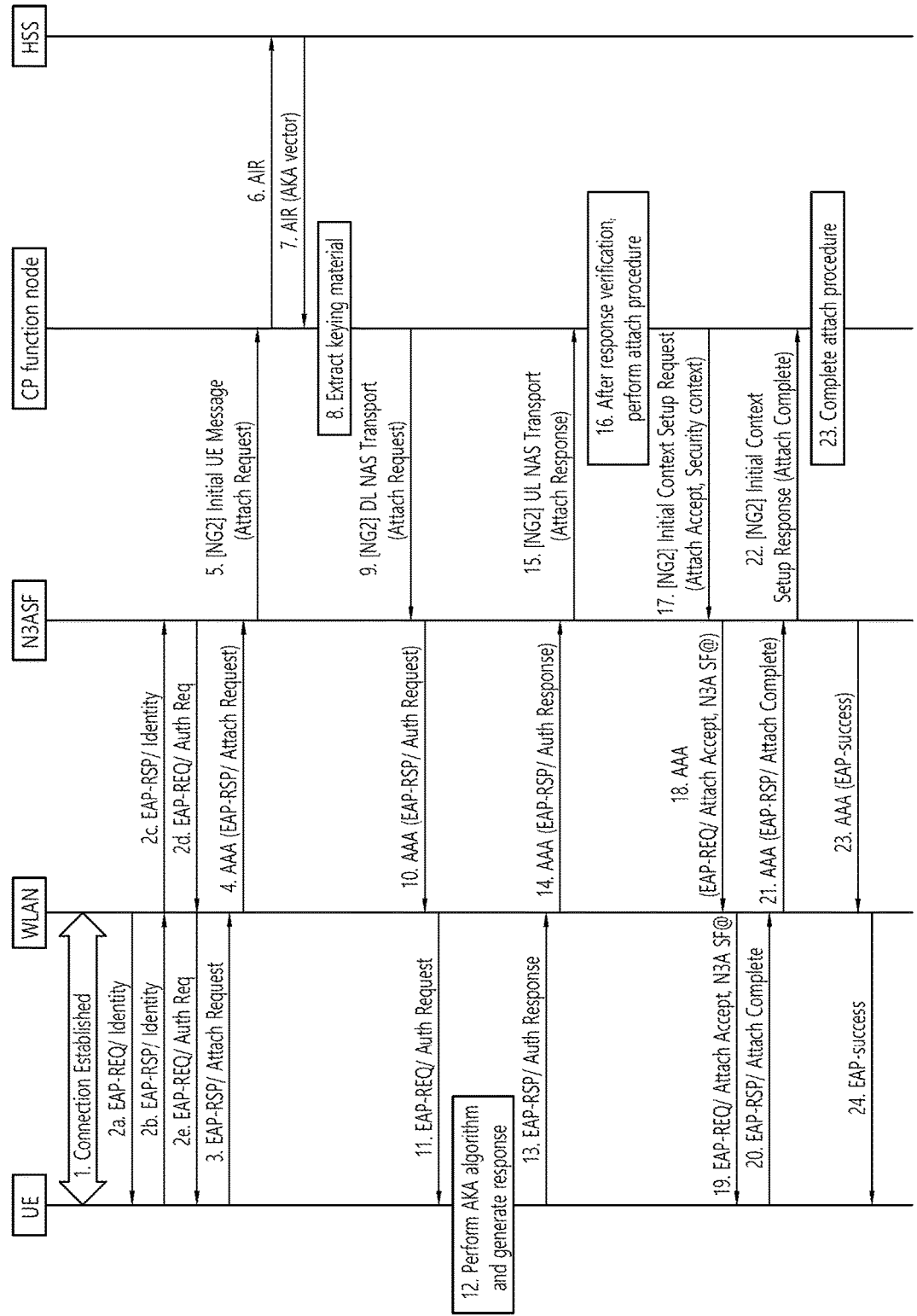
FIG. 6 shows an example in which the UE performs an attach procedure through a non-3GPP access the environment shown in FIG. 4C.

FIG. 6 an example in which the UE performs an attach procedure through a non-3GPP access the environment shown in FIG. 4C.

In the example shown in FIG. 6, it is assumed that the following protocols and the following assumptions are used.

an EAP-over-EAPoL protocol is used between a UE and a WLAN.

an EAP is used within a protocol between the WLAN and an N3ASF.

The EAP is improved and extended to transmit an NAS message for an attach procedure.

This is specifically as follows.

1) Before a UE attempts a connection configuration, the UE may find the attributes/performance of the WLAN (e.g., using new parameters of an ANQP procedure or 802.11 beacon/probe request/probe response message). In this manner, the UE may find that a cellular NAS attach request message must be included as part of WLAN access authentication.

3-4). An NAS attach request message is delivered through an EAP-RSP message.

10-11). An NAS authentication request message is delivered through an EAP-REQ message.

12) The UE induces a key material for protecting an N3-AS connection.

13-14). An NAS authentication response message is delivered through an EAP-RSP message.

17) In order to derive a keying material for protecting the N3-AS connection, access-independent security context used by the N3ASF is provided.

18-19) An NAS attach accept message is delivered through an EAP-REQ message. Furthermore, information for the bootstrap of an N3-AS protocol connection is also provided. The type of bootstrap information may be different depending on an N3-AS protocol stack. For example, the bootstrap information may include the IP address and UDP port number of the N3ASF.

20-21) An NAS attach complete message is delivered through an EAP-RSP message.

When the attach procedure is completed, the UE and the N3ASF use an N3-AS protocol for an additional message exchange (e.g., session management or mobility management procedure).

Figure 7:
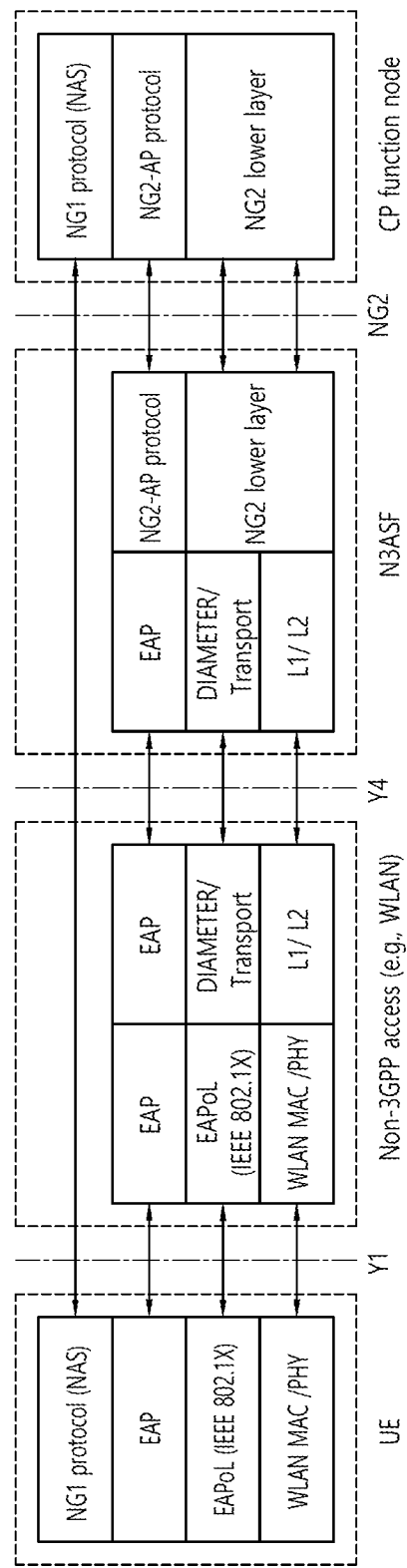
FIG. 7 shows an example of the stack of an NG1 protocol while a UE performs an attach procedure.

FIG. 7 shows an example of the stack of an NG1 protocol while a UE performs an attach procedure.

The shown NG1 protocol is used after the bootstrap of the N3-AS connection shown in FIG. 6.

Meanwhile, in FIGS. 1A, 4A, 4B, 4C, 5A, 5B, 5C, 6, 7, etc., the interface has been named NGx (e.g., NG1, NG2, NG3, . . . ), but the interface may be named Nx (e.g., N1, N1, N3, . . . ).

Figure 8:
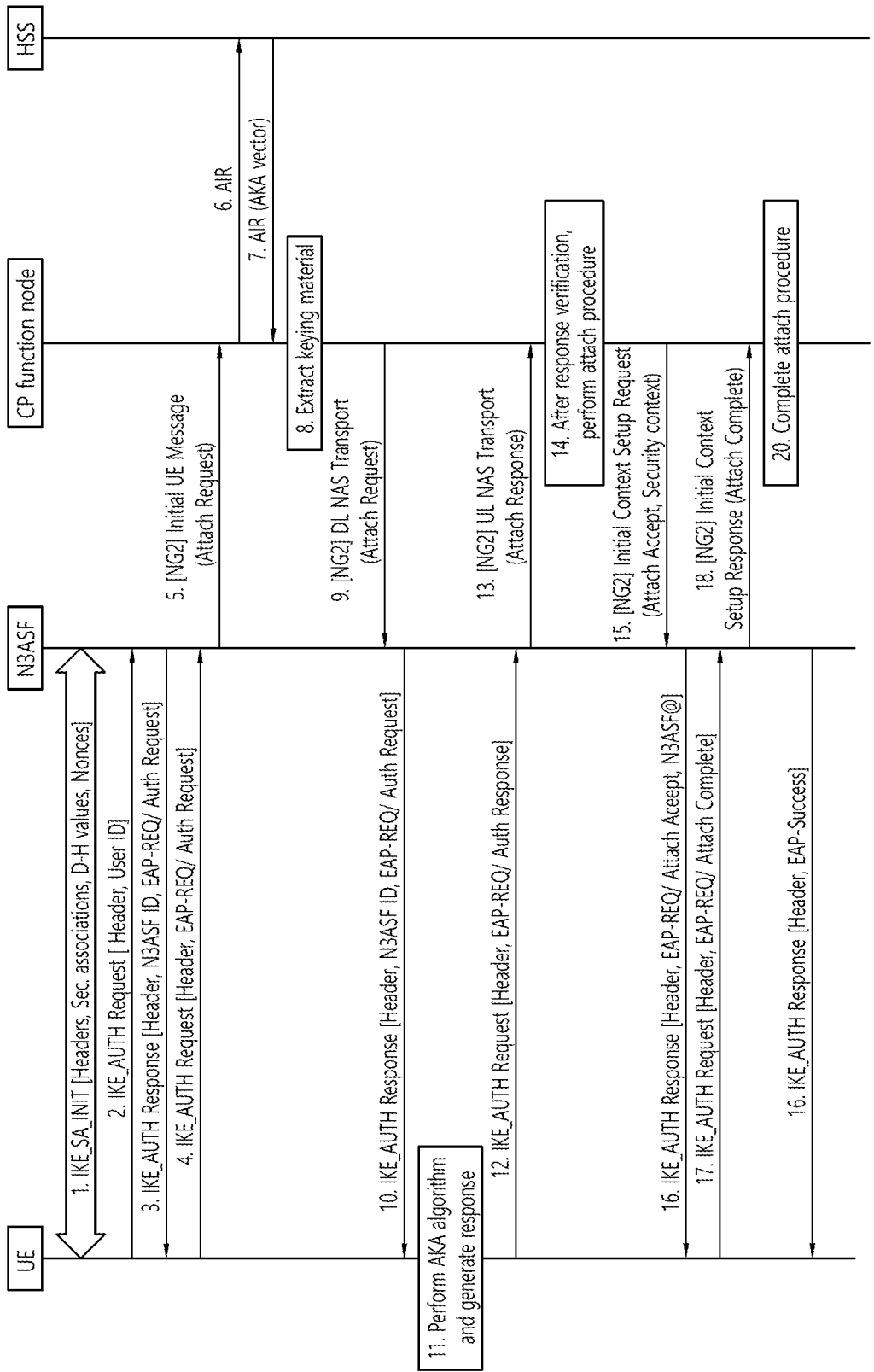
FIG. 8 shows a transfer process of IKEv2 between the UE and the N3ASF when the UE performs an attach procedure through a non-3GPP access in the environment shown in FIG. 4C.

FIG. 8 shows a transfer process of IKEv2 between the UE and the N3ASF when the UE performs an attach procedure through a non-3GPP access in the environment shown in FIG. 4c.

In the example shown in FIG. 8, it is assumed that the following protocols and the following assumptions are used.

An EAP is used within a protocol between the UE and the N3ASF.

The EAP is improved and extended to transmit an NAS message for an attach procedure This is described specifically as follows.

1) Before the UE attempts an IKEv2 connection configuration, the UE may discover the N3ASF. In this case, one of the followings is configured within the UE.

The IP address (or IP address set) of an N3ASF node.

An FQDN (or FQDN set) which may be identified as the IP address of the N3ASF.

A DHCP configuration is used.

3-14) In the shown procedure, in order to minimize a change in the IKEv2 protocol, an NAS message is included in EAP payload and delivered. Alternatively, the NAS message may be directly transmitted through an IKEv2 parameter (e.g., within 3GPP-related IKEv2 configuration payload) or using IPsec transmission.

15) In order to derive a keying material for protecting an N3-AS connection, access-independent security context used by the N3ASF is provided.

When the attach procedure is completed, the UE and the N3ASF use the N3-AS protocol for an additional message exchange (e.g., session management or mobility management procedure).

As described so far, in next-generation mobile communication, it is expected that a UE may generate a plurality of sessions over different access networks.

At this time, if there is no connection (or attach) to another access network (e.g., a non-3GPP access network) after connection to any one access network (e.g., 3GPP access network), a serving MMF (Mobility Management Function) registered in an access network (for example, a 3GPP access network) may transmit information necessary for accessing a common MMF such as an ID/address of a common MMF to a home subscriber server (HSS) or a third network node, and the HSS (or the third network node) may store information necessary for accessing the common MMF.

In the present specification, a common MMF may also be referred to as a MMF.

Also, if there is no connection (or attachment) to another access network (e.g., a non-3GPP access network) after connection to any one access network (e.g., 3GPP access network), when the serving MMF registered in any one access network (e.g., 3GPP access network) sends an attach accept message, the serving MMF can recognize itself as a common MMF and send information necessary for accessing a common MMF such as an ID/address of the common MMF to the UE.

When attaching to another access network (for example, a non-3GPP network) after connecting to any one access network (for example, a 3GPP access network), a CP (control plane) used for authentication and a CP processing the attach NAS message may be different from each other. That is, when the UE is unable to send a message including the additional information through the IETF IKE protocol as shown in step 4 of FIG. 8, even if the UE receives information about the serving MMF (common MMF) after the attachment to the 3GPP access network, the UE cannot send information about the serving MMF (common MMF) to the network system. Therefore, the authentication CP may be the common MMF, or may be a separate network CP separated from the common MMF.

During the authentication procedure, the authentication CP can transmit its ID and address information to the UE. Also, during the authentication procedure, the routing information stored in the Non-3GPP Packet Data Gateway (ngPDG) can be configured based on the common CP information acquired through the interaction with the HSS (or the third network node).

In the present specification, PDG may also be referred to as ngPDG for convenience.

Depending on the embodiment, information on the common CP may be transmitted using a separate signaling between the CP function node and the N3ASF (or ngPDG), or information on the common CP may also be transmitted in step 9 or step 15 of FIG. 8. Based on the routing information, the N3ASF (or ngPDG) can forward a message received through an IPsec (Internet Protocol Security) tunnel to a common CP. In addition, when the message to be transmitted in step 4 of FIG. 8 includes information of the common CP, the PDG can select the authentication CP based on the received NAS information so that the authentication CP and the CP processing the NAS attach message become the same.

Disclosure of the Present Invention

The present disclosure proposes a method for efficiently managing a session when an authentication CP used for authentication and a CP processing an attach NAS message are different when a UE creates a plurality of sessions through different access networks.

Figure 9:
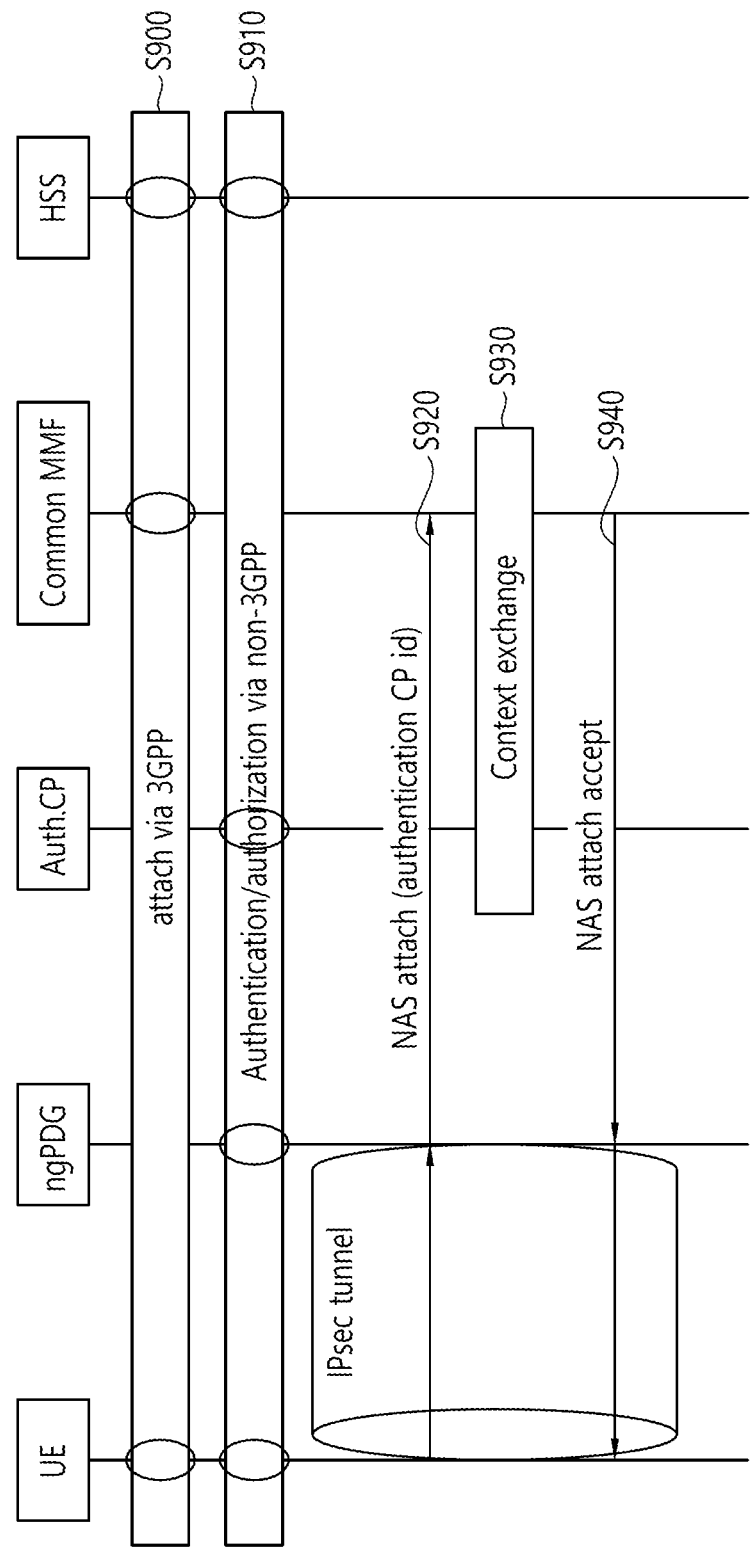
FIG. 9 shows a method of attaching to a non-3GPP access network and accessing a common CP after attachment to a 3GPP access network in accordance with an embodiment of the present invention.

FIG. 9 shows a method of attaching to a non-3GPP access network and accessing a common CP after attachment to a 3GPP access network.

Referring to FIG. 9, the UE can access the network system through the 3GPP access network (S900). The UE can acquire information on the common MMF. Information on the common MMF may be stored in the HSS. The UE transmits a registration request message (attach request message) to the network system, and the registration request message (attach request message) may include the ID information of the UE. For example, the registration request message (attach request message) may include an International Mobile Subscriber Identity (IMSI) or a Globally Unique Temporary Identifier (GUTI).

When the registration procedure through the 3GPP access network has been successfully completed, a context for the UE may be generated in the common MMF. The context for the UE can be configured/managed on a per-access basis.

When registering in the network system through the 3GPP access network, a mobility management (MM) context for 3GPP access can be created. When a packet data network (PDN) connection is created at the same time as registration (attachment) such as EPS (Evolved Packet System), that is, when a PDU session is created simultaneously with registration in the 5G system, a session management (SM) connection can be additionally generated.

The UE may attempt to connect to the network via the non-3GPP access network after accessing the network system with the 3GPP access network. The UE may perform an authentication procedure to create an IPsec tunnel between the terminal and the ngPDG (S910). The UE may perform an IKEv2 tunnel establishment procedure. At this time, according to the operation of the IETF protocol, the ID information of the UE may be included in the establishment of the IKEv2 tunnel. For example, an NAI (Network Access Identifier) may be included in the ID information of the UE.

The ngPDG may configure the routing information based on information on the common MMF obtained from the HSS (or the third network node) during the authentication procedure. The ngPDG may store information on the authentication CP in the routing table. If information on the common MMF is included in the information obtained from the HSS (or the third network node), the ngPDG should update the information on the authentication CP stored in the routing table with the information on the common MMF. Further, based on the information on the common MMF obtained from the HSS (or the third network node), the authentication CP can recognize that the UE should be connected to the common MMF and can store the information indicating that the UE should be connected to the common MMF.

When the IPsec tunnel is completed, a security context for the UE may be generated in the authentication CP.

After the authentication procedure is completed, an IPsec tunnel is created between the UE and the ngPDG, and the UE transmits a NAS (non-access stratum) registration message (NAS attach message) to the common MMF through the IPsec tunnel via the ngPDG (S920). The ngPDG may transmit the NAS message to the common MMF based on the routing information. The NAS message may include information indicating that the authentication procedure through the non-3GPP access network has been completed, and information on the authentication CP. Depending on the embodiment, the information indicating that the authentication procedure is completed may directly indicate the completion of the authentication procedure, and it may be recognized that the authentication procedure is completed through the information on the authentication CP. The NAS registration message (NAS attach message) may include the ID of the UE. The ID of the UE may include the GUTI.

The ngPDG may not be able to recognize what information is included in the NAS message. Therefore, the ngPDG does not transmit the NAS registration message (NAS attach message) to the common MMF based on the GUTI, but can forward the NAS registration message (NAS attach message) to the common MMF based on the routing information.

Based on the information about the authentication CP included in the NAS message, the common MMF can access the authentication CP, and the common MMF can request the transmission of the authentication context and the security context (S930). Upon receiving the authentication context information and the authentication context information from the common MMF, the authentication CP can transmit the authentication context and the security context to the common MMF based on the information indicating that the authentication CP should be connected to the stored common MMF.

The detailed operation of the common MMF in the above process is as follows.

1) First, the common MMF can receive NAS messages.

2) The common MMF can confirm whether the access network, via which the NAS message has passed, is a 3GPP access network or a non-3GPP access network.

3) The common MMF can check whether there is a generated context by registering in the network system through the 3GPP access network based on the GUTI, and receive a context (e.g., the MM context of the UE) which is generated by registration in the network system through the 3GPP access network. The MM context of the UE can be configured/managed for each access, and the MM context for 3GPP access can be generated/updated through the above process.

4) Based on the ID of the authentication CP received separately from the GUTI, the common MMF can recognize that the security context of the UE generated through the non-3GPP access network exists, and the common MMF can transmit the security context from the authentication CP. The context of the UE can be configured/managed for each access, and an MM context for non-3GPP access can be generated through the above process. When the processing for the NAS message is successfully completed, an MM context for the non-3GPP access network may exist.

The common MMF may transmit a NAS attach accept message to the UE (S940). The common MMF may send information, which indicates that the context update has been successfully completed, to the ngPDG and the UE.

Figure 10:
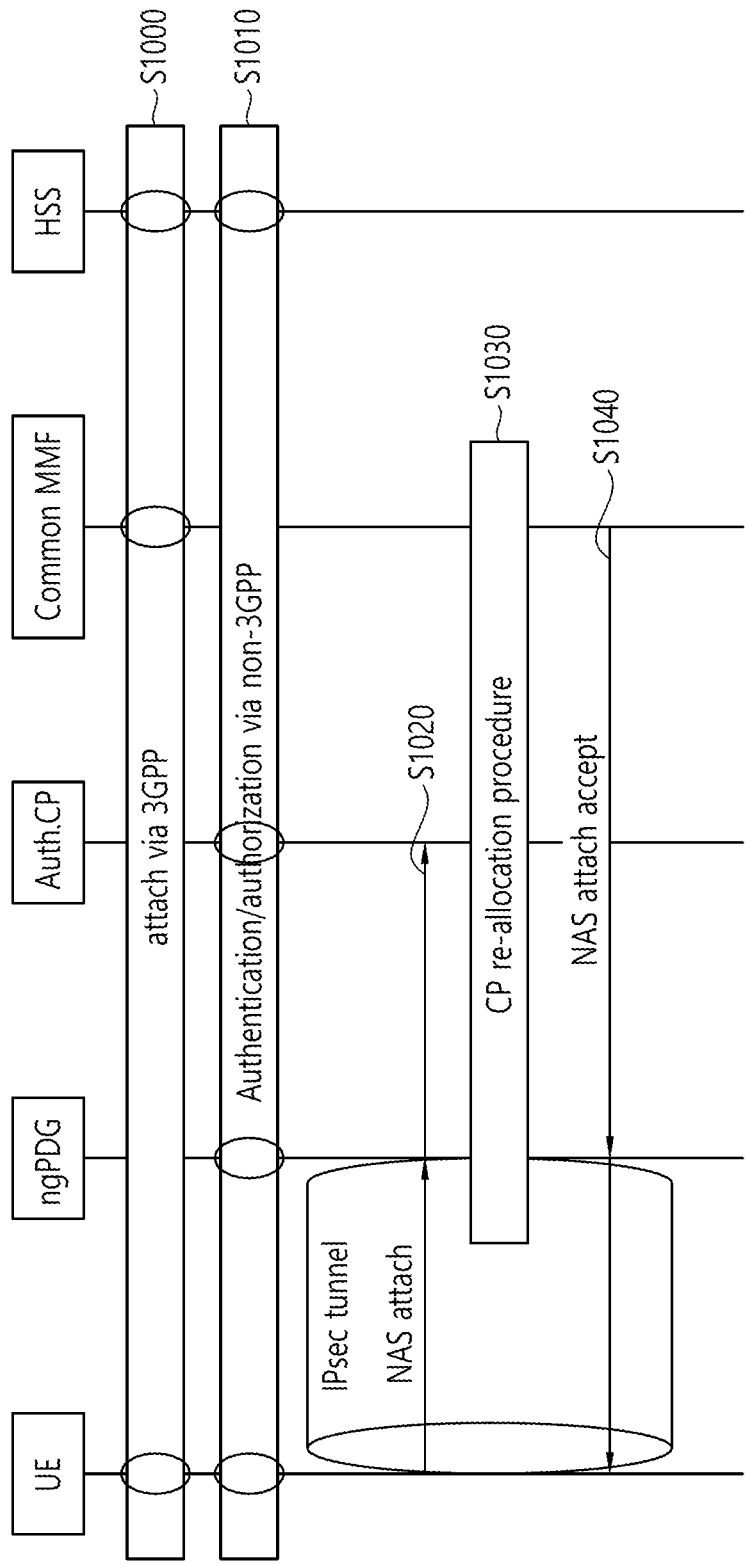
FIG. 10 shows a method of attaching to a non-3GPP access network and accessing a common CP after attachment to a 3GPP access network in accordance with another embodiment of the present invention.

FIG. 10 shows a method of attaching to a non-3GPP access network and accessing a common CP after attachment to a 3GPP access network in accordance with another embodiment of the present invention.

Referring to FIG. 10, the UE can access the network system through the 3GPP access network (S1000). The UE can acquire information on the common MMF. Information on the common MMF may be stored in the HSS.

The UE may attempt to connect to the network via the non-3GPP access network after accessing the network system with the 3GPP access network. The UE may perform an authentication procedure to create an IPsec tunnel between the terminal and the ngPDG (S1010). The ngPDG may configure routing information based on the information on the authentication CP. The authentication CP can recognize that the UE should be connected to the common MMF based on the information about the common CP obtained from the HSS (or the third network node), and can store the information indicating that the UE should be connected to the common MMF. The authentication CP may store the security context of the UE.

After the authentication procedure is completed, an IPsec tunnel may be created between the terminal and the ngPDG. The UE can transmit a NAS (non-access stratum) registration message (NAS attach message) to the authentication CP via the ngPDG through the IPsec tunnel (S1020). The ngPDG may transmit the NAS message to the authentication CP based on the routing information. The NAS message may include information on a common MMF.

Depending on the embodiment, if the NAS message does not contain information for the common MMF, the ngPDG may obtain information about the common MMF through interaction with the HSS (or a third network node).

When the NAS message is received, the authentication CP can determine whether to perform NAS attachment (i.e., whether to handle NAS). The authentication CP can determine whether to perform a NAS attachment based on information indicating that the UE should be connected to the common MMF. That is, if there is information indicating that the UE should be connected to the common MMF, the authentication CP can request NAS handling to the common CP.

The authentication CP may recognize that CP re-allocation to the common MMF is required based on information indicating that the UE should be connected to the common MMF. Then, the authentication CP can perform the CP re-allocation procedure to the common MMF (S1030). The context stored in the authentication CP can be transmitted to the common MMF. The common MMF can recognize that the authentication procedure has been successfully completed based on the received context. The context transmitted to the common MMF may include the security context of the UE. The common CP may create an MM context for the non-3GPP access network.

Depending on the embodiment, if there is a direct interface between the authentication CP and the common MMF (common CP), the authentication CP can forward the NAS message to the common CP. At this time, the authentication CP can forward the security context together. When the CP reallocation is completed, the authentication CP can transmit a notification to the ngPDG to update the routing table of the ngPDG.

According to another embodiment, if there is no direct interface between the authentication CP and the common MMF (common CP), the authentication CP may request the ngPDG to forward the NAS message to the common CP. At this time, the authentication CP can transmit the security context to the common MMF. After CP reallocation is completed, the ngPDG can update the routing table.

The common MMF may transmit a NAS attach acknowledgment message to the UE (S1040). The common MMF may send information, which indicates that the context update has been successfully completed, to the ngPDG and the UE.

What has been described so far can be implemented in hardware. This will be described with reference to the drawings.

Figure 11:
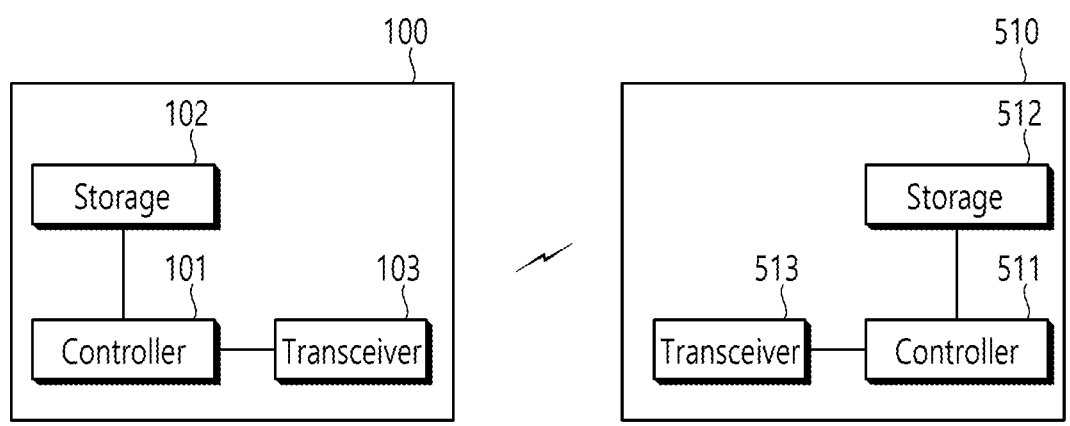
FIG. 11 is a configuration block diagram of a UE and a network node according to an embodiment of the present invention.

FIG. 11 is a configuration block diagram of a UE and a network node according to an embodiment of the present invention.

As shown in FIG. 11, the UE 100 includes a storage unit 101, a controller 102, and a transmission/reception unit 103. And the network node may be an access network (AN), a radio access network (RAN), an AMF, a CP function node, an SMF. The network node includes a storage unit 511, a controller 512, and a transmission/reception unit 513.

The storage means stores the above-described method.

The controllers control the storage means and the transmission/reception units. Specifically, the controllers each execute the methods stored in the storage means. And the controllers transmit the above-described signals through the transmission/reception units.

While the present invention has been described with reference to exemplary embodiments, it is to be understood that the invention is not limited to the disclosed exemplary embodiments, but, on the contrary, can be modified, changed, or improved in various forms within the idea of the present invention and the scope of claims.

What is claimed is:

1. A method for processing a non-access-stratum (NAS) request message performed at a mobility management function (MMF) node, the method comprising:

receiving the NAS request message from a terminal;

checking which access network the NAS request message from the terminal has been received via;

checking, when the NAS request message from the terminal is confirmed to have been received via a second access network, whether there are a first mobility management (MM) context and a first security context which have been generated during a previous registration process through a first access network, based on information included in the NAS request message;

obtaining a second security context, generated during an authentication procedure for the second access network, from an authentication control plane (CP) node;

generating a second MM context based on at least one of the first MM context and the first security context, and the second security context obtained through the second access network; and transmitting a response message to the NAS request message to the terminal through a packet data gateway (PDG), wherein the terminal creates a plurality of sessions through the first and second access networks, wherein the MMF node recognizes the first and second security contexts based on an identifier (ID) of the authentication CP node, wherein the terminal is identified by the information contained in the NAS request message, which is a Global Unique Temporary Identity (GUTI), wherein the NAS request message further includes information on the authentication CP, wherein, if the first MM context is updated based on the second security context, the second security context present in the authentication CP node is released, and wherein, the first MM context and the second MM context are created and managed in access units.

2. The method of claim 1, wherein the NAS request message is received from a PDG (Packet Data Gateway) or received from the authentication CP.

3. The method of claim 1, wherein the terminal communicates with at least one of a mobile device, a network and a self-driving car other than the terminal.

4. A mobility management function (MMF) node comprising:

a transceiver configured to receive a non-access-stratum (NAS) request message from a terminal; and a processor configured to check which access network the NAS request message has received via, wherein the processor further configured to:

check, when the NAS request message from the terminal has been received through a second access network, whether there are a first mobility management (MM) context and a first security context which have been generated during a previous registration process through a first access network, based on information included in the NAS request message;

obtain a second security context, generated during an authentication procedure for the second access network, from an authentication control plane (CP) node; and generate a second MM context based on at least one of the first MM context and the first security context, and the second security context obtained through the second access network, and wherein the transceiver transmits a response message to the NAS request message to the terminal through a packet data gateway (PDG), wherein the terminal creates a plurality of sessions through the first and second access networks, wherein the MMF node recognizes the first and second security contexts based on an identifier (ID) of the authentication CP node, wherein the terminal is identified by the information contained in the NAS request message, which is a Global Unique Temporary Identity (GUTI), wherein the NAS request message further includes information on the authentication CP, wherein, if the first MM context is updated based on the second security context, the second security context present in the authentication CP node is released, and wherein, the first MM context and the second MM context are created and managed in access units.

* * * * *